(12) United States Patent
Chen et al.

(10) Patent No.: US 9,021,847 B2
(45) Date of Patent: May 5, 2015

(54) LUMINOUS CHARACTER ENCLOSING MACHINE

(75) Inventors: Qinghan Chen, Weifang (CN); Xuetao Chen, Weifang (CN); Xuebo Chen, Weifang (CN)

(73) Assignee: Weifang Handun CNC Equipment Co., Ltd., Shandong (CN)

( * ) Notice: Subject to any disclaimer, the term of this patent is extended or adjusted under 35 U.S.C. 154(b) by 887 days.

(21) Appl. No.: 13/262,492

(22) PCT Filed: May 31, 2009

(86) PCT No.: PCT/CN2009/000604
§ 371 (c)(1),
(2), (4) Date: Sep. 30, 2011

(87) PCT Pub. No.: WO2010/121401
PCT Pub. Date: Oct. 28, 2010

(65) Prior Publication Data
US 2012/0024030 A1     Feb. 2, 2012

(30) Foreign Application Priority Data

Apr. 21, 2009   (CN) .......................... 2009 1 0014823

(51) Int. Cl.
*B23D 1/26* (2006.01)
*B23P 23/02* (2006.01)
(Continued)

(52) U.S. Cl.
CPC . *B23D 1/26* (2013.01); *B21D 17/00* (2013.01); *B21D 5/042* (2013.01); *B23P 23/02* (2013.01); *G09F 13/00* (2013.01)

(58) Field of Classification Search
CPC ............ B21D 5/04; B21D 5/042; B21D 5/08; B21D 5/14; B21D 17/00; B23P 23/02; B23P 23/04; B23D 1/26
USPC ........... 72/129, 131, 132, 172, 173, 175, 217, 72/219, 294, 306, 307, 387, 388
See application file for complete search history.

(56) References Cited

U.S. PATENT DOCUMENTS 2,371,138 A * 3/1945 Harrison et al. ................. 72/307
3,503,109 A * 3/1970 Krall ......................... 29/898.056
(Continued)

FOREIGN PATENT DOCUMENTS

CN    2380342 Y    5/2000
CN    2393699 Y    8/2000
(Continued)

OTHER PUBLICATIONS

International Search Report of International Application No. PCT/CN2009/000604 dated Dec. 18, 2009.

*Primary Examiner* — Edward Tolan
(74) *Attorney, Agent, or Firm* — Fay Sharpe LLP

(57) ABSTRACT

A luminous character enclosing machine has an upper supporting plate (2) and a lower supporting plate (3) which are installed on a machine frame (1). A plate inlet and a plate outlet are formed respectively on two ends of the upper and lower supporting plates. A feeding unit, a grooving unit, an arc-curving unit, and a plate-clamping unit arranged between the two supporting plates are provided in succession from the plate inlet to the plate outlet. A grooving driving device is installed on the machine frame, and drives the grooving device to move up and down. This kind of grooving mode is a cold processing mode, heat generation during working which makes color of the stainless steel plates change is avoided, and a phenomenon of knife broken due to high speed rotation of a saw blade and the hardness of the stainless steel is prevented. The machine is simple in structure and convenient to operate.

8 Claims, 3 Drawing Sheets

(51) Int. Cl.
*G09F 13/00* (2006.01)
*B21D 17/00* (2006.01)
*B21D 5/04* (2006.01)

(56) References Cited

U.S. PATENT DOCUMENTS

| | | | |
|---|---|---|---|
| 4,037,445 A | | 7/1977 | Winter et al. |
| 5,463,890 A | * | 11/1995 | Tachibana ................. 72/294 |
| 5,697,138 A | * | 12/1997 | Swanson et al. ............ 29/33 S |
| 5,881,591 A | * | 3/1999 | Ondracek ................... 72/14.9 |
| 6,003,571 A | | 12/1999 | Broussard |
| 6,158,264 A | * | 12/2000 | Mizukawa ................... 72/294 |
| 6,487,887 B2 | * | 12/2002 | Yamada ...................... 72/294 |
| 6,564,442 B2 | | 5/2003 | Kilian et al. |
| 7,387,009 B2 | * | 6/2008 | Kane et al. ................... 72/307 |
| 7,882,720 B2 | * | 2/2011 | Mizukawa et al. ........... 72/307 |

FOREIGN PATENT DOCUMENTS

| | | |
|---|---|---|
| CN | 101148013 A | 3/2008 |
| CN | 201201144 Y | 3/2009 |
| GB | 544471 | 4/1942 |
| JP | 11129133 A | 5/1999 |

\* cited by examiner

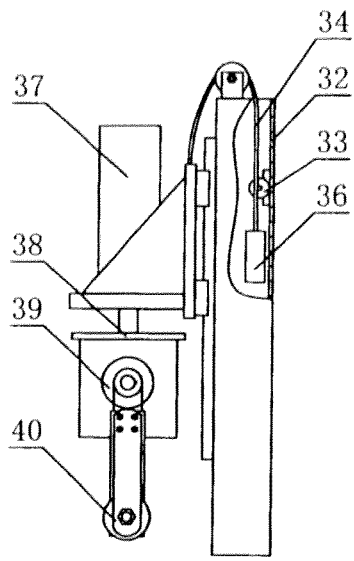
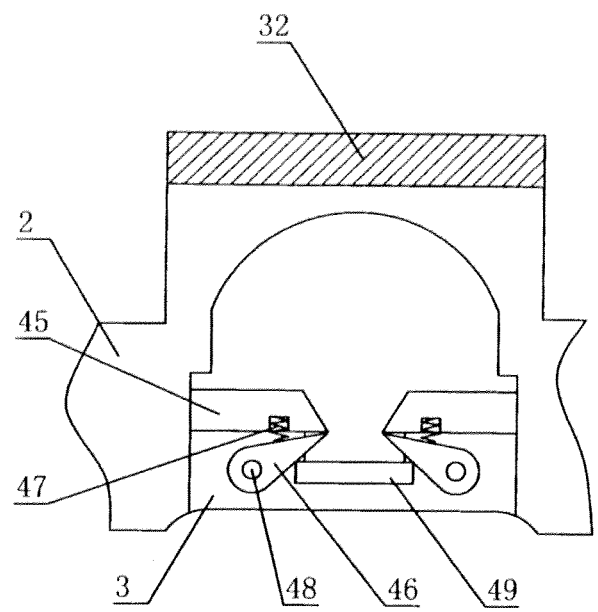
Fig. 2          Fig. 3
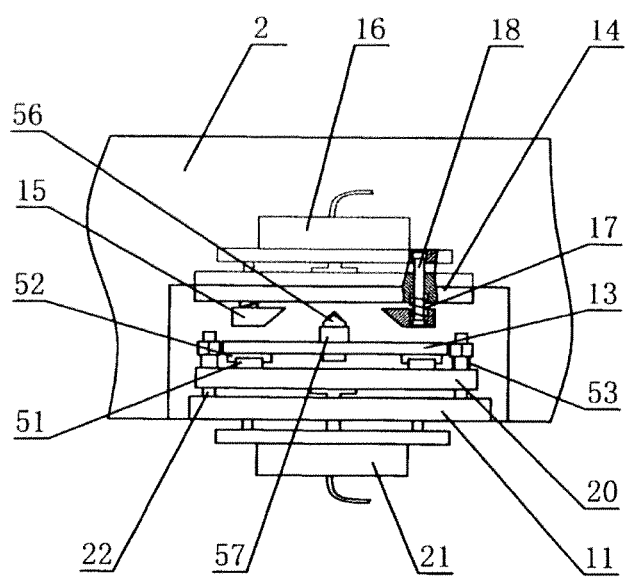
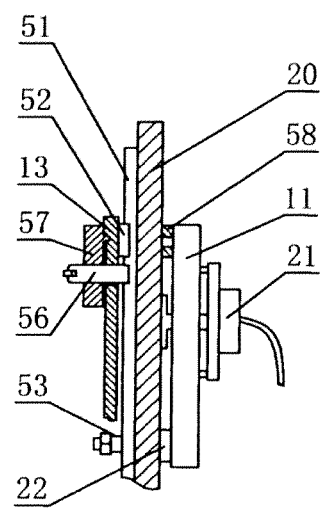
Fig. 4          Fig. 5

LUMINOUS CHARACTER ENCLOSING MACHINE

FIELD OF THE INVENTION

The invention relates to the technical field of plate bending, in particular to a full-automatic luminous character enclosing machine used for enclosing edge of a stereoscopic luminous character.

BACKGROUND OF THE INVENTION

In recent years, stereoscopic luminous characters become the first choice for billboards because of their attractive and high-grade appearances and low cost. The edge of a stereoscopic luminous character is usually made to form a grooved character with an aluminum alloy sheet and a stainless steel sheet, and the intermediate part is filled by an LED luminous board or a common plastic sheet. The main work of making a stereoscopic luminous character edge is edge enclosure which mainly includes edge bending and arc curving. Traditional edge bending and arc curving are manual processes or using a cutting blade to carry out grooving followed by machining, thereby costing time and labor and having ugly appearance. Using a stainless steel sheet to make a grooved character requires high-pressure water jet to make a hollow-out character, and the high-pressure water jet has the power usually over 10 KW and is not so fast in cutting speed, therefore its cost is high and energy consumption is large. After the hollow-out character is made by cutting, an edge band needs to be welded to form a character shell. Edge band welding costs time and labor and has heat emission. Some advertisement companies use very thick stainless steel for making a hollow-out character to show their high-grade produces, and it costs long cutting time and high energy consumption. In order to provide a special device, the applicant has disclosed a stereoscopic luminous character enclosing machine (patent No.: 200710113527.5), which includes a feeding unit mounted on a main board of a machine body, a groove-cutting unit and an arc-curving unit, wherein the groove-cutting unit includes a traversing rack and an elevating rack mounted on the traversing rack, the traversing hack and the elevating rack are respectively driven by a motor through a ball screw, a motor-driven saw disc is mounted on the elevating rack, an arc-curving pressure roller elevating unit is mounted on the traversing rack, and an arc-curving pressure roller capable of passing through the main board of the machine body is disposed on the upper end of the arc-curving pressure roller elevating unit. This luminous character enclosing machine has the disadvantages as follows: first, heat is easily generated during cutting due to use of the saw disc for grooving, resulting in discoloration of a stainless steel band, and thus the machine is not suitable for groove-cutting of a stainless steel band; second, when a luminous character edge is completed, manual breaking is needed, which is unfavorable for automatic operation of the whole machine.

SUMMARY OF THE INVENTION

The object of the invention is to provide a luminous character enclosing machine suitable for making a stainless steel luminous character edge.

In order to realize the object, the provided luminous character enclosing machine includes an upper supporting plate and a lower supporting plate which are installed on a machine frame, and a plate inlet and a plate outlet are formed respectively on two ends of the upper and lower supporting plates. A feeding unit and an arc-curving unit are arranged in succession from the plate inlet to the plate outlet. The machine is structurally characterized in that a grooving unit and a plate-clamping unit mounted between the upper supporting plate and the lower supporting plate are disposed between the feeding unit and the arc-curving unit, and in addition, a grooving driving device for driving the grooving unit to move is mounted on the machine frame.

With the above structure, because the grooving unit and the plate-clamping unit arranged between the upper supporting plate and the lower supporting plate are disposed between the feeding unit and the arc-curving unit, and the machine frame is further provided with the grooving driving device for driving the grooving device to move and can control the grooving driving device to drive the grooving unit to move up and down, the grooving unit can groove a plate when doing up-down movement. Since such grooving mode is cold processing mode, it can neither cause discoloration of the stainless steel plate due to heat generation, nor result in knife broken due to high speed rotation of a saw blade and the hardness of the stainless steel. The invention is simple in structure and convenient to operate and especially suitable for grooving of a stainless steel character edge.

The grooving unit includes a vertical plate fixedly mounted between the upper supporting plate and the lower supporting plate, the vertical plate is connected to a tool holder which is capable of sliding vertically, a grooving tool is mounted on the tool holder, and the lower end of the tool holder is dynamically connected to the grooving driving device.

The grooving driving device includes a main motor fixedly mounted on the lower part of the machine frame, a gear is disposed on the power output shaft of the main motor, the lower part of the tool holder is provided with a rack engaged with the gear, and both sides of the rack is provided with guide fixing plates fixedly mounted on the machine frame.

As an improvement of the invention, a tool feed adjusting unit is further mounted on the vertical plate and includes an adjusting plate parallel to the vertical plate, the adjusting plate is connected to the vertical plate via a guide pin, the tool holder is slidably connected to the adjusting plate, an adjusting cylinder is mounted on the outer side surface of the vertical plate, the piston rod of the adjusting cylinder can pass through the vertical plate and extends to the adjusting plate, and a rubber spring is mounted on the guide pin positioned on the inner side of the adjusting plate.

The plate-clamping unit includes a back plate mounted between the upper supporting plate and the lower supporting plate, guide bolts capable of sliding pass through and are mounted on the back plate, pressure plates are fixedly disposed on the inner ends of the guide bolts, the outer end of the guide bolts are fixedly connected to a cylinder, the piston rod of the cylinder is capable of extending to the back plate, and springs are arranged between the pressure plates and the back plate.

The arc-curving unit includes guide rollers which are oppositely and fixedly disposed between the upper supporting plate and the lower supporting plate, the guide rollers provide a passage for a plate to pass through, arc-curving sleeves are sleeved outside the guide rollers, the front parts of the arc-curving sleeves form a plate inlet, the guide rollers have guide plates extending towards the plate inlet, the rear parts of the arc-curving sleeves form a corresponding plate outlet, the transverse width of the plate inlet is much larger than the width of the plate outlet, the side walls of the arc-curving sleeves at the outlet of the passage are respectively provided with press-curving rolling balls capable of rolling, and the arc-curving sleeves are dynamically driven by a servo motor fixedly mounted under the machine frame.

As a further improvement of the invention, a shearing unit is also mounted on the machine frame and includes a rotating shears mounted between the upper supporting plate and the lower supporting plate, the rotating shears is formed by an inner cylinder and an outer cylinder which coaxially rotate and are sleeved together, the front parts of the inner cylinder and the outer cylinder form a plate inlet, the cylinder /ails of the rear parts of the inner cylinder and the outer cylinder are oppositely provided with cutting edges, the outer surfaces of the lower parts of the cylinder walls of the inner cylinder and the outer cylinder are respectively provided with a transmission gear, the lower part of the cylinder wall of the outer cylinder is provided with a notch capable of exposing the lower part of the cylinder wall of the inner cylinder, both sides of the outer cylinder are respectively provided with a transmission rack engaged with the transmission gear, and the transmission racks are dynamically driven by a shearing motor to move in the same direction.

The inner cylinder is sleeved outside the arc-curving sleeves and coaxial with the arc-curving sleeves.

A groove-cutting unit is further mounted on the machine frame and positioned between the feeding unit and the grooving unit, the groove-cutting unit includes a supporting frame and a pressure plate device which are mounted on the machine frame, and an elevating device, a rotating device and a cutting device are mounted on the supporting frame.

The elevating device includes an elevating motor mounted on the machine frame, a transmission belt in transmission connection with the elevating motor, and an elevating frame slidably mounted on the supporting frame, wherein the elevating frame is fixedly connected with the transmission belt, and the other end of the transmission belt is provided with an iron counterweight through a pulley; the rotating device includes a rotating motor fixedly mounted on the elevating frame, and a turn table is disposed on the power output shaft of the rotating motor; the cutting device includes a cutting motor fixedly mounted on the turn table, the cutting motor is in a transmission connection with a cutting tool holder, the cutting surface of the cutting tool holder and the axial line of the power output shaft of the rotating motor are in the same plane; the pressure plate device includes a support connection plate mounted between the upper supporting plate and the lower supporting plate, rotating pressure feet are mounted on the support connection plate and fixedly disposed between the upper supporting plate and the lower supporting plate via rotating shafts, springs are arranged between the rotating pressure feet and the support connection plate whereby a plate passage is formed between the pressure feet and the support connection plate, the lower parts of the rotating pressure foot abut against a pressing plate articulated on the lower supporting plate, and the lower part of the pressing plate abuts against a pressing can driven by a groove-cutting pressure motor.

BRIEF DESCRIPTION OF THE DRAWINGS

The invention is further described in connection with the accompanying drawings:
FIG. 2 is a structure diagram taken in A direction in FIG. 1;
FIG. 3 is a structure diagram taken in B direction in FIG. 1;
FIG. 4 is a structure diagram taken in C direction in FIG. 1;
FIG. 5 is a structure diagram taken in D direction in FIG. 1.

Figure 1:
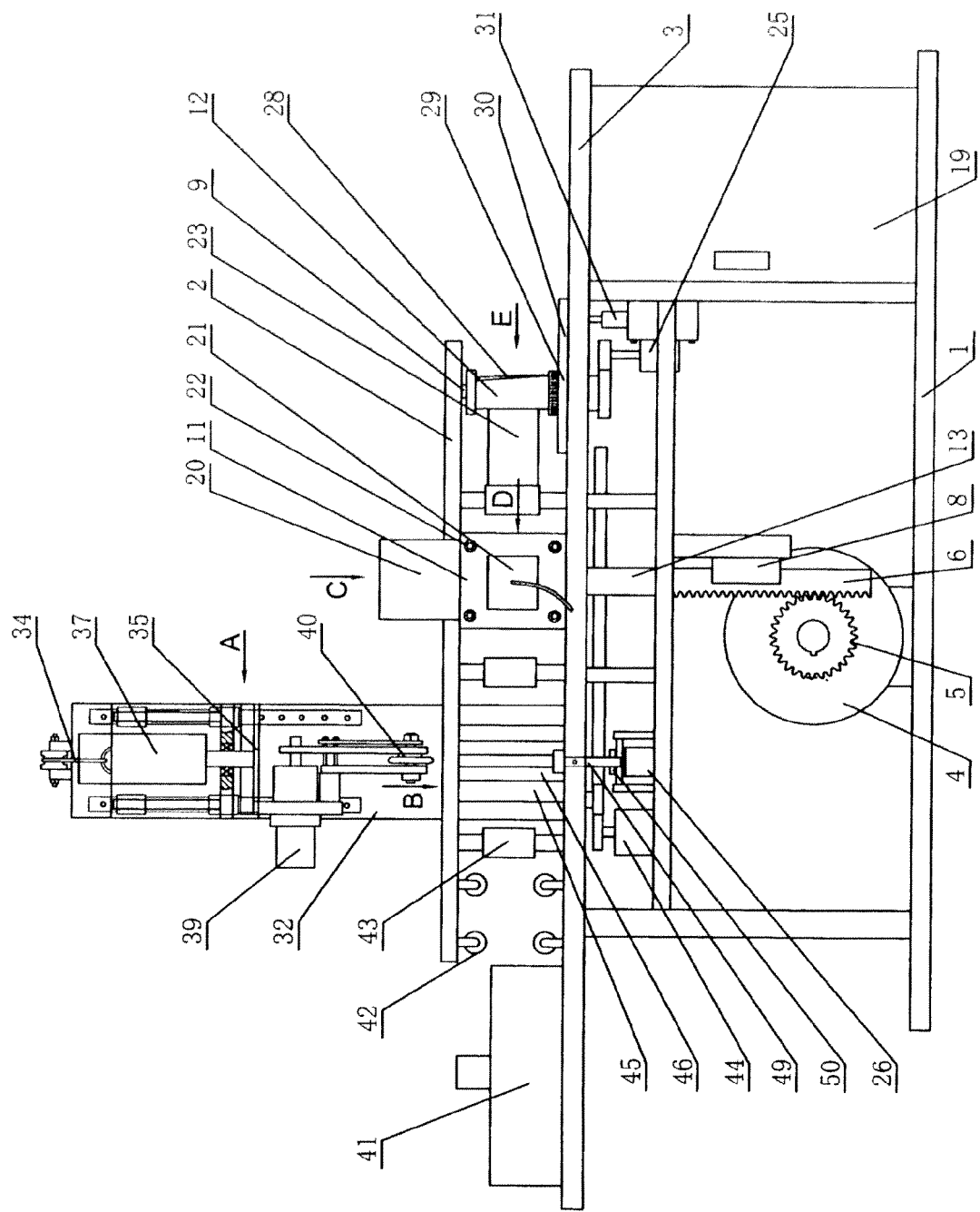
FIG. 1 is a structure diagram of the invention.

Wherein, 1 is machine frame, 2 is upper supporting plate, 3 is lower supporting plate, 4 is main motor, 5 is gear, 6 is rack, 7 is grooving head, 8 is guide fixing plate, 9 is guide roller, 10 is cut groove, 11 is vertical plate, 12 is inner cylinder, 13 is tool holder, 14 is back plate, 15 is pressure plate, 16 is cylinder, 17 is top spring, 18 is guide bolt, 19 is electric control cabinet, 20 is adjusting plate, 21 adjusting cylinder, 22 guide pin, 23 is guide plate, 24 is arc-curving sleeve, 25 is servo motor, 26 is groove-cutting pressure motor, 27 outer cylinder, 28 is cutting edge, 29 is transmission gear, 30 is transmission rack, 31 is shearing motor, 32 is supporting frame, 33 is elevating motor, 34 is transmission belt, 35 is elevating frame, 36 is iron counterweight, 37 is rotating motor, 38 is turn table, 39 is cutting motor, 40 is cutting tool holder, 41 is raw material rotary disc, 42 is guide wheel group, 43 is driving roller, 44 is driving motor, 45 is support connection plate, 46 is rotating pressure foot, 47 is spring, 48 is rotating shaft, 49 is pressing plate, 50 pressing cam, 51 is slide rail, 52 is slide block, 53 is rubber spring, 54 is press-curving rolling hall, 55 is notch, 56 is grooving tool, 57 is grooving tool fixing plate, and 58 is positioning sleeve.

DETAILED DESCRIPTION OF THE PREFERRED EMBODIMENT

The luminous character enclosing machine as shown in the drawings includes an upper supporting plate 2 and a lower supporting plate 3 which are mounted on a machine frame 1 oppositely, the left sides of the upper supporting plate and the lower supporting plate form a plate inlet, and the right sides of the upper supporting plate and the lower supporting plate form a plate outlet. A feeding unit, a groove-cutting unit, a grooving unit, an arc-curving unit and a shearing unit (the positions of the groove-cutting unit and the grooving unit can be exchanged, and the positions should be determined to facilitate convenient installation and maintenance) are disposed in succession on the upper supporting plate and the lower supporting plate from the left to the right. The feeding unit includes a raw material rotary disc 41 fixedly mounted on the lower supporting plate 3 and provided with a plate-stretch opening, guide wheel groups 42 are correspondingly arranged in pair between the upper supporting plate and the lower supporting plate, four to six groups of driving rollers 43 are disposed between the upper supporting plate and the lower supporting plate and dynamically driven by a driving motor 44, the driving motor 44 is fixedly mounted on the machine frame 1 and drives the driving rollers 43 to rotate through a gear-rack transmission mechanism, and the driving rollers in each group are arranged oppositely and rotate in opposite directions to drive a plate to move forward. A grooving driving device and a plate-clamping unit are disposed on the machine frame 1, as shown in FIGS. 1, 3, 4 and 5, a vertical plate 11 is arranged between the upper supporting plate and the lower supporting plate, the grooving driving device includes a maim motor 4 fixedly mounted under the machine frame 1, the power output shaft of the main motor 4 is equipped with a gear 5, a tool holder 13 is slidably connected to the vertical plate 11, the lower part of the tool holder 13 is provided with a rack 6 which is engaged with the gear 5, both sides of the rack 6 are provided with guide fixing plates 8 which are fixedly mounted on the machine frame 1 to ensure engagement between the rack 6 and the gear 5 whereby the rack 6 drives the tool holder 13 to move up and down, and the guide fixing plates 8 are fixedly on the machine frame 1. The vertical plate 11 is equipped with a tool feed adjusting device which includes an adjusting plate 20 parallel to the vertical plate 11, a vertical slide rail 51 is disposed on the adjusting plate 20, the tool holder 13 is provided with a slide block 52 slidably fitted with the slide rail 51, a grooving tool 56 is fixedly mounted on the tool holder 13, an adjusting cylinder 21 is mounted on the outer side surface of the vertical plate 11, the piston rod of the adjusting cylinder 21 can passes through the vertical plate 11 and extends to the adjusting plate 20, a rubber spring 53 is disposed on a guide pin 22 positioned on the inner side of the adjusting plate 20 to ensure the distance and parallelism between the vertical plate 11 and the adjusting plate 20, and a positioning sleeve 58 is also mounted on the guide pin 22 positioned between the vertical plate 11 and the adjusting plate 20. The plate-clamping unit includes a back plate 14 fixedly mounted between the upper supporting plate and the lower supporting plate, a pair of pressure plates 15 which are symmetrically disposed and a cylinder supporting frame for a cylinder 16 are respectively mounted on both sides of the back plate 14 and guidably fixed via guide bolts 18, the upper part and the lower part of the back plate 14 are respectively provided with four slidable guide bolts 18, the inner ends of the guide bolts 18 are fixed to the pressure plates 15, the outer ends of the guide bolts 18 are fixedly connected to the cylinder supporting frame, the piston rod of the cylinder 16 passes through the cylinder supporting frame and can extend to the back plate 14, the two pressure plates 15 respectively correspond to the upper end and the lower end of the back plate 14, the two pressure plates 15 and the upper part and the lower part of the back plate 14 are correspondingly provided with counterbores in which springs 17 are fixedly mounted to enable the pressure plates 15 and the hack plate 14 to form a plate passage between thereof, and the guide bolts 18 pass through the springs 17. When the cylinder 16 is inflated, the piston rod of the cylinder acts on the back plate 14, and then the pressure plates 15 comes close to the hack plate 14 along the lower supporting plate 3 to clamp a plate.

Figure 6:
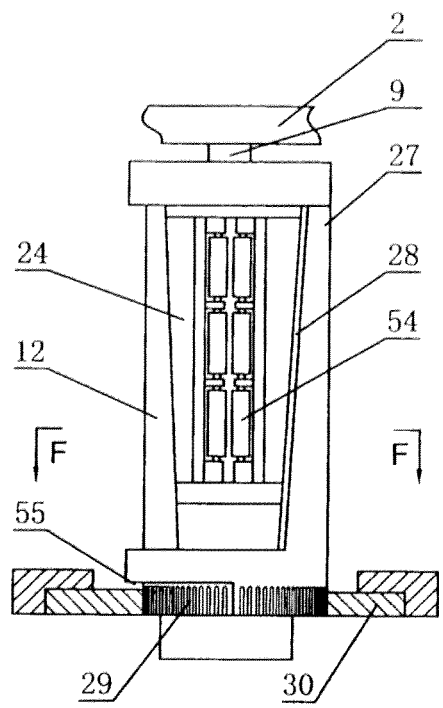
FIG. 6 is a structure diagram taken in E direction in FIG. 1.
Figure 7:
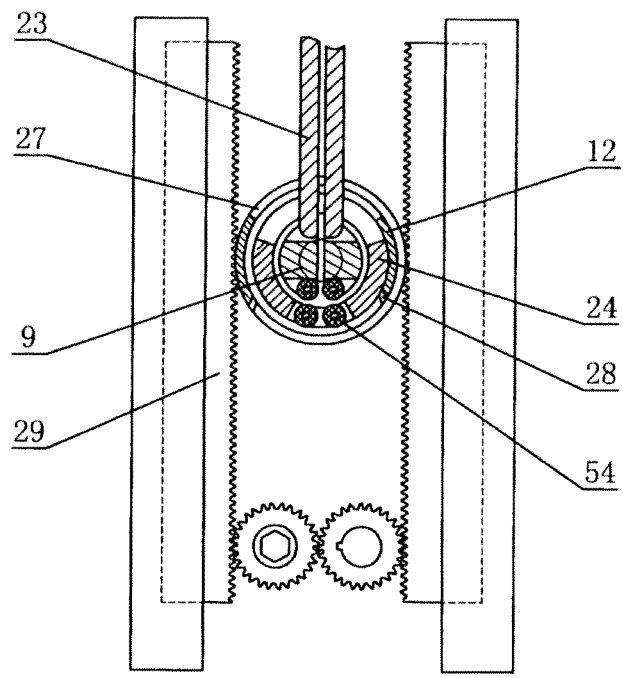
FIG. 7 is a sectional structure diagram taken along F-F in FIG. 6.

Referring to FIG. 6 and FIG. 7, the arc-curving unit includes guide rollers 9 fixedly mounted between the upper supporting plate and the lower supporting plate, the guide rollers 9 provide a passage for a plate to pass through, arc-curving sleeves 24 are sleeved outside the guide rollers 9, the front parts of the arc-curving sleeves 24 form a plate inlet, guide plates 23 extending to the plate inlet are arranged on the guide rollers 9, the rear parts of the arc-curving sleeves 24 form a corresponding plate outlet, the transverse width of the plate inlet is much larger than the width of the plate outlet, the side wall of the arc-curving sleeves 24 at the outlet of the passage are respectively provided with press-curving rolling balls 54 capable of rolling, and the arc-curving sleeves 24 are dynamically driven by a servo motor 25 fixedly mounted under the machine frame 1. A shearing unit is also mounted on the machine frame 1 and includes a rotating shears mounted between the upper supporting plate and the lower supporting plate, the rotating shears is formed by an inner cylinder 12 and an outer cylinder 27 which coaxially rotate and are sleeved together, the front parts of the inner cylinder 12 and the outer cylinder 27 form a plate inlet, the cylinder walls of the inner cylinder 12 and the outer cylinder 27 are oppositely provided with cutting edges 28, the outer surfaces of the lower parts of the cylinder walls of the inner cylinder 12 and the outer cylinder 27 are respectively provided with a transmission gear 29, the lower part of the cylinder all of the outer cylinder 27 is provided with a notch 55 capable of exposing the lower part of the cylinder wall of the inner cylinder 12, both sides of the outer cylinder 27 are respectively provided with a transmission rack 30 engaged with the transmission gear 29, the transmission racks 30 are dynamically driven by a shearing motor 31 to move in the same direction, the shearing motor 30 drives two rotating wheels in opposite directions to drive the transmission racks 30 such that the two transmission racks 30 can move in the same direction, the outer cylinder 27 is sleeved outside the arc-curving sleeve 24 and coaxial with the arc-curving sleeves 24, and alternatively, the shearing unit and the arc-curving unit can be disposed separately such that a plate can be sheared after being arc-bent, so the operations of edge bending and arc curving of a stereoscopic luminous character edge is completed.

As shown in FIG. 1 and FIG. 2, the groove-cutting unit includes a supporting frame 32 and a pressure plate device which are mounted on the machine frame 1, and an elevating device, a rotating device and a cutting device are mounted on the supporting frame 32. The elevating device includes an elevating motor 33 mounted on the machine frame 1, a transmission belt 34 which is in transmission connection with the elevating motor 33, and an elevating frame 5 slidably mounted on the supporting frame 32, wherein the elevating frame 35 is fixedly connected with the transmission belt 34, and the other end of the transmission belt 34 is provided with an iron counterweight 36 through a pulley; the rotating device includes a rotating motor 37 fixedly mounted on the elevating frame 35, and a turn table 38 is disposed on the power output shaft of the rotating motor 37; the cutting device includes a cutting motor 39 fixedly mounted on the turn table 38, the cutting motor 39 is in a transmission connection with a cutting tool holder 40, a cutting shaft where the cutting tool holder 40 is positioned is fixedly mounted on two fixing plates which are fixedly disposed below the turn table 38, a cutting blade is mounted on the cutting tool holder 40, and the cutting surface of the cutting tool holder 40 and the axial line of the power output shaft of the rotating motor 37 are in the same plane; the pressure plate device includes a support connection plate 45 mounted between the upper supporting plate and the lower supporting plate, a pair of rotating pressure feet 46 are symmetrically mounted on the support connection plate 45 and fixedly disposed between the upper supporting plate and the lower supporting plate via rotating shafts 48, springs 47 are arranged between the rotating pressure feet 46 and the support connection plate 45 whereby a plate passage is formed between the pressure feet 46 and the support connection plate 45, a pressing plate 49 tightly abuts against the lower parts of the rotating pressure feet 46, the middle part of the pressing plate 49 is articulated on the lower supporting plate 3, and the lower part of the pressing plate 49 abuts against a pressing cam 50 driven by a groove-cutting pressure motor 26.

A stereoscopic luminous character edge is enclosed with the invention as follows: a stainless steel band stretches out of the plate outlet of the raw material rotary disc 41 and is driven to move forward by the driving rollers 43 after passing through the guide wheel groups 42, the grooving unit is started when the stainless steel band arrives at the grooving unit (the groove-cutting unit is not started temporarily because raw material is a stainless steel band), and the cylinder 16 is inflated simultaneously so that the piston of the cylinder 16 butts the back plate; because the pressure plates 15 and the cylinder 16 are mounted on both side of the back plate 14 and fixed by guide bolts 18, the pop springs 17 between the pressure plates 15 and the back plate 14 are pressed whereby the stainless steel plate is held tightly by the pressure plates 15 and the back plate 14, the tool holder 13 moves downward dynamically driven by the grooving driving device, and the grooving tool 56 mounted on the tool holder 13 can groove the stainless steel band. The stainless steel band is grooved for many times (generally twice) due to high hardness. After the grooving driving device drives the tool holder 13 to groove downward, the main motor 4 rotates reversely to drive the tool holder 13 to move upward when arriving at a certain position, in order to prevent the grooving tool 56 from touching the stainless steel band to cause scratches or non-collinear grooving lines when the tool holder 13 moves upward. The grooving tool 56 is fixedly mounted on a grooving tool fixing plate 57, the upper end of the grooving tool fixing plate 57 is articulated on the tool holder 13, the rear end of the grooving tool 56 extends into the tool holder 13, and the grooving tool 56 and the grooving tool fixing plate 57 can rotate away from the stainless steel plate along the hinge shaft thereof, such that the tool holder 13 can not touch the stainless steel plate when moving upward. When the tool holder 13 moves up to a certain height, the main motor 4 rotates reversely again to drive the tool holder 13 to move downward for second grooving, the adjusting cylinder 21 is started simultaneously, the vertical plate 11 is fixedly mounted between the upper supporting plate and the lower supporting plate such that the piston of the adjusting cylinder 21 butts the adjusting plate 20, the adjusting plate 20 moves forward a distance along the lower supporting plate 3 to adjust the amount of feed of the tool holder 13 whereby the grooving depth of the stainless steel band is increased to meet the requirement of edge bending (the adjusting plate moves forward a minimal distance, so that it can not affect the transmission connection between the gear 5 and the rack 6). Because the guide pin 22 passing through the adjusting plate 20 and the vertical plate 11 is provided, and the rubber spring 53 is arranged on the guide pin 22 positioned on the inner vertical surface of the adjusting plate 20, the adjusting plate 20 moves forward a distance and can ensure the parallelism between the adjusting plate and the vertical plate 11, so that the two grooving operations can be at the same grooving line. The rubber spring 53 plays a role of restoring the adjusting cylinder 21 after adjusting the feed of the grooving tool, and simultaneously the rubber spring 53 springs the adjusting plate 20 back to the original position such that grooving can be carried out at another position of the stainless steel character edge band. Arc curving is then carried out at a specified position of the stainless steel band with the arc-curving unit, and finally, the stainless steel character edge is cut by the shearing unit to complete the molding of the whole character edge.

Groove-cutting process of a plate is carried out as follows: an aluminum strip stretches out of the plate-stretch opening of the raw material rotary disc 41 and is driven to move forward by the driving rollers 43 after passing through the guide wheel groups 42. When the plate moves to the groove-cutting unit and needs to be cut, the groove-cutting pressure motor 26 is started to drive the pressing cam 50 to rotate a certain angle to push the lower end of the pressing plate 49 a distance, and because the middle part of the pressing plate 49 is articulated on the lower supporting plate 3, the upper part of the pressing plate 49 presses the two rotating pressure feet 46, and the two rotating pressure feet 46 come close to the support connection plate 45 such that a plate passage becomes narrower to tightly hold the plate. The cutting motor 39 is started simultaneously to drive the cutting tool holder 40 to rotate, and the elevating motor 33 is started whereby the transmission belt 34 drives the cutting tool holder 40 to move downward and cut the plate; when the plate needs to be grooved on both sides, the upper supporting plate 2 is provided with cut grooves 10, and after the elevating motor 33 drives the cutting tool holder 40 to a certain height, the rotating motor 37 is started to drive the cutting tool holder into the cut groove 10 to cut the other side of the plate, and because the cutting surface of the cutting tool holder 40 and the axial line of the power output shaft of the rotating motor 37 are in the same plane, the two cut grooves can be ensured to be on the both sides of the same position when the cutting blade mounted on the cutting tool holder 40 cut both sides of the plate. The rotating motor 37 can freely rotate at any angle under electric control to carry out grooving of different depths and directions, thereby meeting the grooving requirements of different character edge plates.

The operations of arc curving and cutting of a character edge band are realized with the arc-curving unit and the cutting unit as follows: a character edge hand plate enters arc-curving sleeves 24 from the guide plates 23, the side walls of the arc-curving sleeves 24 at the plate outlet are longitudinally and evenly provided with press-curving rolling balls 55, when a control program controls a servo motor 25 to rotate at a certain angle according to the requirement of a character, the arc-curving sleeves 24 rotate accordingly, and because the guide rollers 9 in the arc-curving sleeve 24 are fixed, the press-curving rolling balls 54 press the plate and bend the plate to a certain angle, and the rotation of the press-curving rolling balls 54 can eliminate sliding friction between the press-curving rolling balls and the plate during arc curving. After the arc curving is completed, the shearing motor 31 is started to drive the two transmission racks 30 to move in the same direction such that the inner cylinder 12 and the outer cylinder 27 rotate in opposite directions, the cutting edges 28 of the inner cylinder 12 and the outer cylinder 27 interact on each other to cut the character edge band to finish the molding of the character edge band.

In the invention, all motors and grooving driving devices such as the cylinder 16 are operated and controlled by an electric control cabinet 19 through electric control, and because the control principles and processes are well know in the prior art, there is no need to go into details here.

The invention claimed is:

1. A luminous character enclosing machine, comprising: an upper supporting plate (2) and a lower supporting plate (3) which are installed on a machine frame (1), a plate inlet and a plate outlet being formed respectively on two ends of the upper and lower supporting plates, a feeding unit and an arc-curving unit being arranged in succession from the plate inlet to the plate outlet, characterized in that a grooving unit and a plate-clamping unit mounted between the upper supporting plate and the lower supporting plate are disposed between the feeding unit and the arc-curving unit, and in addition, a grooving driving device for driving the grooving unit to move is mounted on the machine frame (1);

wherein the grooving unit comprises a vertical plate (11) fixedly mounted between the upper supporting plate and the lower supporting plate, the vertical plate (11) is connected to a tool holder (13) which is capable of sliding vertically, and the lower end of the tool holder (13) is dynamically connected to the grooving driving device;

a tool feed adjusting unit is further mounted on the vertical plate (11) and comprises an adjusting plate (20) parallel to the vertical plate (11), the adjusting plate (20) is connected to the vertical plate (11) via a guide pin (22), said tool holder (13) is slidably connected to the adjusting plate (20), an adjusting cylinder (21) is mounted on the outer side surface of the vertical plate (11), the piston rod of the adjusting cylinder (21) can pass through the vertical plate (11) and extends to the adjusting plate (20), and a rubber spring (53) is mounted on the guide pin (22) positioned on the inner side of the adjusting plate (20).

2. The luminous character enclosing machine according to claim 1, characterized in that the grooving driving device comprises a main motor (4) fixedly mounted on the lower part of the machine frame (1), a gear (5) is disposed on the power output shaft of the main motor (4), the lower part of the tool holder (13) is provided with a rack (6) engaged with the gear (5), both, sides of the rack (6) is provided with guide fixing plates (8) fixedly mounted on the machine frame (1).

3. The luminous character enclosing machine according to claim 1, characterized in that the plate-clamping unit comprises a back plate (14) mounted between the upper supporting plate and the lower supporting plate, guide bolts (18) capable of sliding pass through and are mounted on the back plate (14), pressure plates (15) are fixedly disposed on the inner ends of the guide bolts (18), the outer ends of the guide bolts (18) are fixedly connected to a cylinder (16), the piston rod of the cylinder (16) is capable of extending to the back plate (14), and springs (17) are arranged between the pressure plates (15) and the back plate (14).

4. The luminous character enclosing machine according to claim 1, characterized in that said arc-curving unit comprises guide rollers (9) which are oppositely and fixedly disposed between the upper supporting plate and the lower supporting plate, the guide rollers (9) provide a passage for a plate to pass through, arc-curving sleeves (24) are sleeved outside the guide rollers (9), the front parts of the arc-curving sleeves (24) form a plate inlet, the guide rollers (9) have guide plates (23) extending towards the plate inlet, the rear parts of the arc-curving sleeves (24) form a corresponding plate outlet, the transverse width of the plate inlet is much larger than the width of the plate outlet, the side walls of the arc-curving sleeves (24) at the outlet of the passage are respectively provided with press-curving rolling balls (54) capable of rolling, and the arc-curving sleeves (24) are dynamically driven by a servo motor (25) fixedly mounted under the machine frame (1).

5. The luminous character enclosing machine according to claim 1, characterized in that a shearing unit is also mounted on the machine frame (1) and comprises a rotating shears mounted between the upper supporting plate and the lower supporting plate, the rotating shears is formed by an inner cylinder (12) and an outer cylinder (27) which coaxially rotate and are sleeved together, the front parts of the inner cylinder (12) and the outer cylinder (27) form a plate inlet, the cylinder walls of the rear parts of the inner cylinder (12) and the outer cylinder (27) are oppositely provided with cutting edges (28), the outer surfaces of the lower parts of the cylinder walls of the inner cylinder (12) and the outer cylinder (27) are respectively provided with a transmission gear (29), the lower part of the cylinder wall of the outer cylinder (27) is provided with a notch (55) capable of exposing the lower part of the cylinder wall of the inner cylinder (12), both sides of the outer cylinder (27) are respectively provided with a transmission rack (30) engaged with the transmission gear (29), and the transmission racks (30) are dynamically driven by a shearing motor (31) to move in the same direction.

6. The luminous character enclosing machine according to claim 5, characterized in that the inner cylinder (12) is sleeved outside the arc-curving sleeves (24) and coaxial with the arc-curving sleeves (24).

7. The luminous character enclosing machine according to claim 1, characterized in that a groove-cutting unit is further mounted on the machine frame (1) and positioned between the feeding unit and the grooving unit, the groove-cutting unit comprises a supporting frame (32) and a pressure plate device which are mounted on the machine frame (1), and an elevating device, a rotating device and a cutting device are mounted on the supporting frame (32).

8. The luminous character enclosing machine according to claim 7, characterized in that the elevating device comprises an elevating motor (33) mounted on the machine frame (1), a transmission belt (34) in transmission connection with the elevating motor (33), and an elevating frame (35) slidably mounted on the supporting frame (32), wherein the elevating frame (35) is fixedly connected with the transmission belt (34), and the other end of the transmission belt (34) is provided with an iron counterweight (36) through a pulley; said rotating device comprises a rotating motor (37) fixedly mounted on the elevating frame (35), and a turn table (38) is disposed on the power output shaft of the rotating motor (37); said cutting device comprises a cutting motor (39) fixedly mounted on the turn table (38), the cutting motor (39) is in a transmission connection with a cutting tool holder (40), the cutting surface of the cutting tool holder (40) and the axial line of the power output shaft of the rotating motor (37) are in the same plane; said pressure plate device comprises a support connection plate (45) mounted between the upper supporting plate and the lower supporting plate, rotating pressure feet (46) are mounted on the support connection plate (45) and fixedly disposed between the upper supporting plate and the lower supporting plate via rotating shafts (48), springs (47) are arranged between the rotating pressure feet (46) and the support connection plate (45) whereby a plate passage is formed between the pressure feet (46) and the support connection plate (45), the lower parts of the rotating pressure feet (46) abut against a pressing plate (49) articulated on the lower supporting plate (3), and the lower part of the pressing plate (49) abuts against a pressing cam (50) driven by a groove-cutting pressure motor (26).

* * * * *